(No Model.)
J. A. A. PINARD.
DEVICE FOR TESTING THE SPEED OF HOUNDS.
No. 362,396. Patented May 3, 1887.
2 Sheets—Sheet 1.
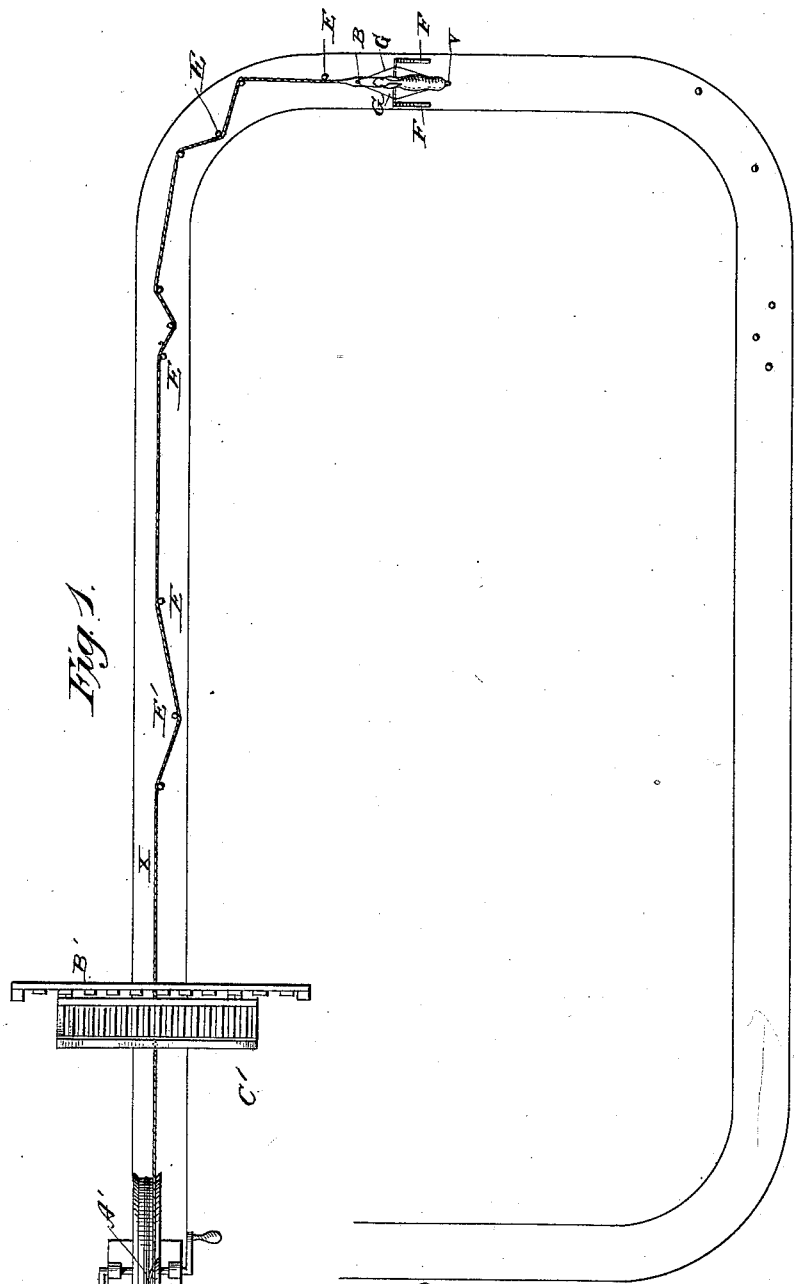
WITNESSES
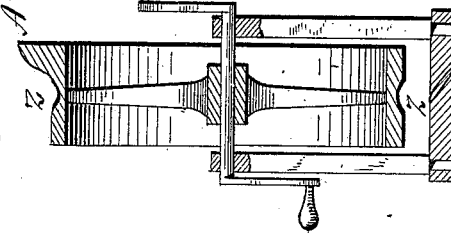
INVENTOR
Attorneys,

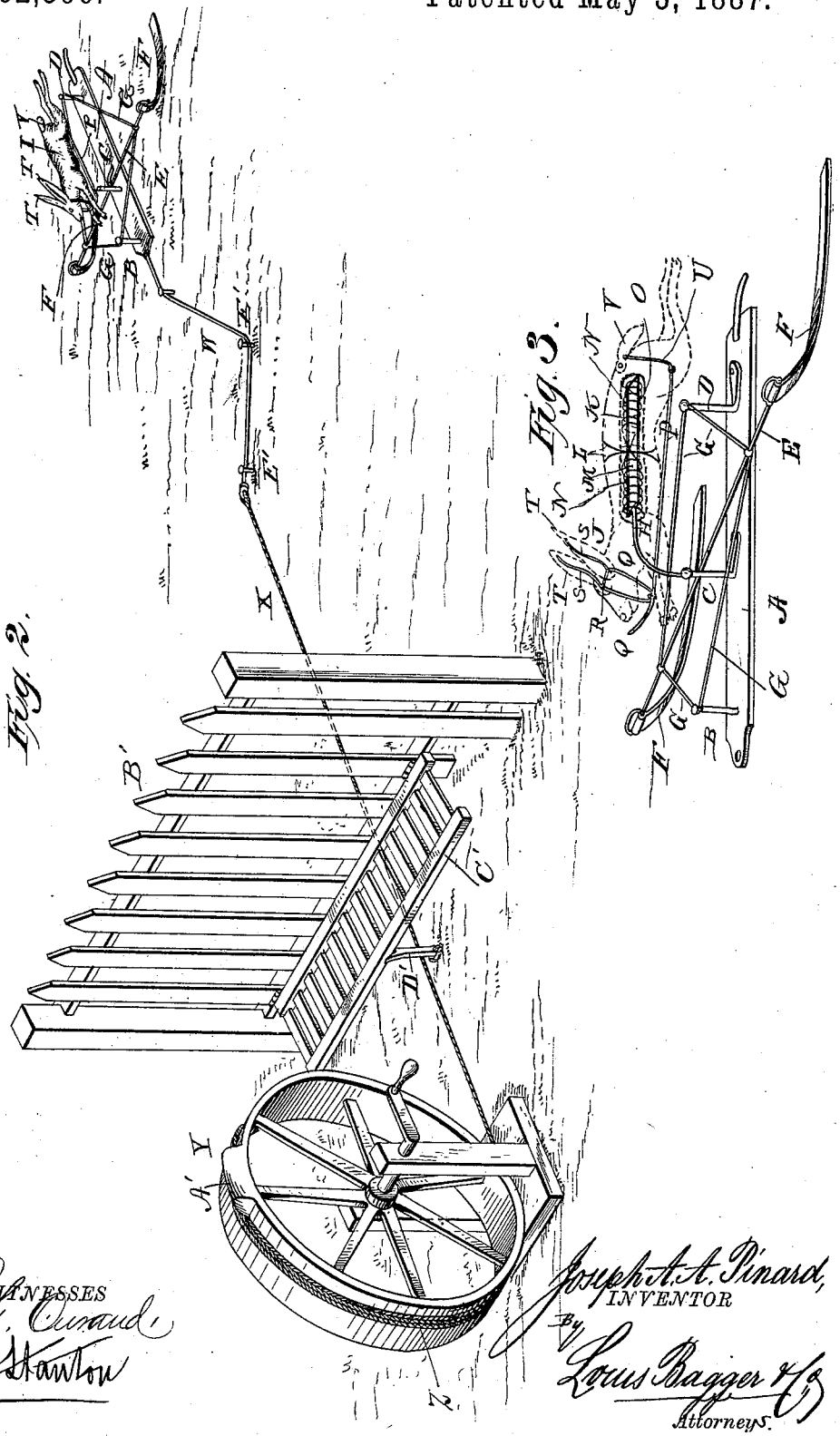

UNITED STATES PATENT OFFICE.

JOSEPH ANTONY ALFRED PINARD, OF SAN JOSÉ, CALIFORNIA.

DEVICE FOR TESTING THE SPEED OF HOUNDS.

SPECIFICATION forming part of Letters Patent No. 362,396, dated May 3, 1887.

Application filed August 3, 1886. Serial No. 209,930. (No model.)

*To all whom it may concern:*

Be it known that I, JOSEPH ANTONY ALFRED PINARD, a citizen of the United States, and a resident of San José, in the county of Santa Clara and State of California, have invented certain new and useful Improvements in Devices for Testing the Speed of Hounds; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view or diagram showing my improved device for testing the speed of hounds. Fig. 2 is a perspective view of the device in operation, showing the imitation hare near the finish. Fig. 3 is a view of the hare and sled, the hare being shown in dotted line; and Fig. 4 is a vertical axial sectional view of the winding-wheel.

Similar letters of reference indicate corresponding parts in all the figures.

My invention has relation to devices for testing the speed of hounds by dragging an imitation of an animal over the ground at considerable speed; and it consists in the improved construction and combination of a device for accomplishing this and of the mechanism for giving the motion of the animal a resemblance to the motion of a live animal, as hereinafter more fully described and claimed.

In the accompanying drawings, the letter A indicates a metallic plate of a sufficient width to form a support for the imitation animal without offering too much frictional resistance when dragged over the ground, and this plate is provided with three uprights, B, C, and D, at the ends and middle of the plate.

A transverse rod, E, is secured at its middle to the central upright and is provided at its ends with curved rearwardly-projecting yielding runner-rods F F, which may serve for the purpose of steadying the base-plate when the latter is dragged over the ground. Oblique brace-rods G are secured at their ends to the end posts of the plate and to the transverse rod, forming a rhomboid frame.

A rearwardly-curved spring, H, is secured to the central upright, C, and passes into the forward portion of the body of the imitation animal I, which is formed by two halves, J and K, having their meeting ends L L rounded. A rod, M, connects these two halves together, as also the ends of two coiled springs, N N, secured loosely within cylindrical recesses O in the two halves of the body.

A rock-shaft, R, is journaled transversely across the head of the animal, to the ends of which shaft are secured the arms S S, which project up through the ears T T. Two other arms, Q Q, are also secured to this shaft and project down toward the front legs of the animal. A horizontal rod, P, is pivotally secured at its front end to the lower ends of the arms Q Q and at its rear end. The rear end of this rod is pivotally connected to a rod, U, the upper end of which is connected to the pivoted tail V of the animal, so that when the two halves of the body are moved, rocking against each other with their rounded ends, the ears and tail will be moved by the said rod and the arms.

The entire body of the animal is covered with skin, in imitation of the live animal, the skin covering all joints in the body.

A flexible rod, W, is attached to the forward end of the plate, and a cord, X, is attached to the forward end of this rod, winding upon a wheel or drum, Y, at the end of the track. This wheel is formed with a groove, Z, into which the cord may be wound, and the side of the wheel is provided with a bulge, A', projecting from the periphery of the wheel and having a side beveled toward the groove, so that in revolving the wheel and winding the cord upon the same the cord may be drawn up upon the bulge and again slipped off from the same into the groove, causing the plate and animal to jump once at each revolution of the wheel. The wheel may be revolved by any suitable means, and a fence, B', is built in front of the wheel, having an upwardly-swinging trap-door, C', through which the cord passes, and which may be supported by means of a loose prop, D', which may be tilted when the animal enters through the trap-door, allowing the said door to drop.

Pegs E' are placed in a zigzag line upon the track at curves of the same and immediately in front of the fence, the pegs at the curves serving to guide the cord and at the same time to give the plate and animal a zigzag movement similar to the motion of a rabbit or hare, and at the end of the course, immediately before the fence, the pegs will stop the speed of the plate and animal, allowing it to pass under the trap-door without damage to itself or to the door.

It will thus be seen that the animal may be started immediately in front of a pack of hounds which will imagine that the animal is alive and will follow it, the motions of the dummy or imitation animal being sufficiently life-like to deceive the hounds, and the dummy may be dragged at any desired speed over the course, causing the hounds to follow and to run at their utmost speed, the device thus affording a convenient and sure means for testing the speed of hounds.

The guide runners at the sides of the frame will prevent the dummy from upsetting, and the dummy being supported upon a spring and having the movable halves of its body connected by springs and having the pivoted ears and tail connected by the rod, the motion of the dummy when drawn over the course, and being drawn with sudden jerks when the cord passes over the bulge and slips, will be comparatively life-like, or, at any rate, sufficiently life-like to deceive the hounds, which will follow it in the same manner in which they would follow a live animal. The pegs, being planted in the ground, will also add to the life-like appearance of the animal, as they will give the course of the animal a zigzag motion found in the course of a chased hare or rabbit, besides serving to guide the cord around curves.

Having thus described my invention, I claim and desire to secure by Letters Patent of the United States—

1. A device for inducing hounds to run for speed-testing purposes, consisting of a runner or sled having a cord attached to it and means for swiftly winding the said cord, and a dummy animal supported by springs from the said runner or sled, the body of said dummy being composed of two halves and adapted to move upon each other at their adjacent ends, as and for the purpose shown and set forth.

2. In a device for inducing hounds to run for speed-testing purposes, the combination of a suitable runner or sled having an upright at its middle, a forward half of a dummy-animal body having a rounded rear end and a cylindrical recess in the said end, a rearwardly-curved spring entering the forward end of the body-half and secured to the upright of the runner, a rear body-half having its forward end rounded and provided with a cylindrical recess, and springs coiled within the recesses and secured in them and having a rod connecting their meeting ends, as and for the purpose shown and set forth.

3. In a device for inducing hounds to run for speed-testing purposes, the combination of a suitable runner or sled having an upright, a dummy-body having a flexible joint at its middle and supported from the upright of the sled upon a spring, a transversely-journaled rock-shaft in the upper portion of the head of the animal and having downwardly-projecting arms and upwardly-projecting ears secured to it, a tail pivoted to the body and having a downwardly-projecting arm, and a rod pivotally secured to the downwardly-projecting arms of the ears and tail, as and for the purpose shown and set forth.

4. In a device for inducing hounds to run for speed-testing purposes, the combination of a plate or runner having uprights at its middle and at its ends and having a dummy animal supported from the middle upright, a transverse rod secured to the central upright and having flexible runners secured rearwardly projecting from its ends, and oblique brace-rods secured to the uprights at the ends of the runner and to the transverse rod, as and for the purpose shown and set forth.

5. In a device for inducing hounds to run for speed-testing purposes, the combination of a runner or sled having a spring-supported dummy animal, a cord attached to the sled, pegs secured in a zigzag line, substantially as described, and means for winding the cord, as and for the purpose shown and set forth.

6. In a device for inducing hounds to run for speed-testing purposes, the combination of a runner or sled having a dummy animal upon it and having a flexible rod secured to its forward end, pegs secured, substantially as described, in a zigzag line, and a cord secured to the flexible rod, and means for winding the cord, as and for the purpose shown and set forth.

7. In a device for inducing hounds to run for speed-testing purposes, the combination of a runner or sled having a dummy animal upon it and provided with a cord attached to its forward end, a wheel or drum for winding the cord upon it, and a fence secured in front of the drum and provided with an upwardly-swinging trap-door supported by a movable prop, the cord passing through the door-opening, as and for the purpose shown and set forth.

8. In a device for inducing hounds to run for speed testing purposes, the combination of a runner or sled having a dummy animal upon it and having a cord attached to its forward end with a wheel having a peripheral groove for receiving the cord and provided in the periphery with a bulge beveled to one side, as and for the purpose shown and set forth.

In testimony that I claim the foregoing as my own I have hereunto affixed my signature in presence of two witnesses.

JOSEPH ANTONY ALFRED PINARD.

Witnesses:
RICHARD HEALY,
JOHN COONEY.